Nov. 10, 1970   J. K. KAYARIAN   3,539,381
METHOD AND APPARATUS FOR FLOW COATING
Filed Feb. 19, 1969

INVENTOR
JACQUES K. KAYARIAN
BY
ATTORNEYS

United States Patent Office 3,539,381
Patented Nov. 10, 1970

3,539,381
METHOD AND APPARATUS FOR FLOW COATING
Jacques K. Kayarian, 704 Clarendon Road, Drexel Hill, Pa. 19026
Continuation-in-part of application Ser. No. 456,765, May 18, 1965. This application Feb. 19, 1969, Ser. No. 814,871
Int. Cl. B05b 15/00
U.S. Cl. 117—102           3 Claims

ABSTRACT OF THE DISCLOSURE

A method and apparatus for coating articles comprising providing an atmosphere at ambient temperatures consisting essentially of the vapors of a solvent, applying to said articles a coating composition containing a volatile solvent while said articles are in said vapors at said temperatures, and removing said articles slowly from said atmosphere.

---

The present application is a continuation-in-part of application Ser. No. 456,765 filed May 18, 1965, now abandoned.

The present invention is directed to the coating of various articles or work with film-forming compositions, such as paints, lacquers and enamels, and more particularly to continuous operation in line production.

Such operations are well known and are in commercial use and are often termed "flow-coating." This is far superior to dipping in that there is substantially less composition necessary to provide full protection to the article being coated. Also there is less loss of paint due to contamination of the body of the coating composition in the tank. In the changing of the composition to a different color or different type of composition, it only necessary to flush the system with solvent. However, conventional flow-coating exhibits a number of disadvantages.

As the liquid composition leaves the spray nozzles, it splashes over the work or articles being coated and into the sump of the tank. Thereby, a substantial amount of the solvent vaporizes and is lost, so that expense is incurred in replacing it, in continuous addition of solvent to keep the viscosity of the paint at the desired level. In addition, it may create a fire hazard and may also be a health hazard to the operators. An equally serious drawback is that the drainage of the wet coated article when under the influence of gravity is such that the finished coat has a greater thickness at the bottom than at the top. Attempts have been made to control the thickness of the coat by controlling the adjustment of the concentration of the vapor in the drying or baking tunnels through which the coated articles are passed. But these attempts have proven not to be satisfactory since such controls are quite delicate and the open ends of tunnels and flow-coaters interfere with adequate and accurate adjustment.

The present invention is intended and adapted to overcome the difficulties and disadvantages inherent in the above-described coating systems, it being among the objects of the present invention to provide a method of and apparatus for, coating articles with film-forming compositions which is simple and effective, and which does not require complicated or expensive equipment.

It is also among the objects of this invention to provide a system which is economical in the use of such compositions and which is adapted to coat articles uniformly therewith.

It is further among the objects to provide a system which will reduce solvent loss to a minimum and to control the thickness to a very fine degree and within an extremely minute fraction of an inch.

It is still further among the objects hereof to provide a system which is eminently suitable for continuous operation.

In practicing the invention, the usual flow-coating apparatus is modified in that instead of a conventional vapor chamber in straight line behind the spray area, the spray nozzles of the flow coater are conveniently placed in the proximity of the lowest point of a dip in a continuously powered overhead conveyor line carrying the work to be coated. The dip in the line is confined by a sump tank which would be similar to a dip tank in shape. Instead of filling the tank with liquid, it becomes filled with an atmosphere of vapors of the solvent mixture, so that all the atomized thinner vapors create a saturated vapor blanket around the spray area which tends to restrain and fully arrest more vaporization of the thinners in the paint. Also of remarkable importance is that this saturated vapor atmosphere is about 7% and therefore not explosive.

One of the important features of this invention is the carrying out of the process at such temperatures that no flashing of the paint solvent occurs. This is best accomplished by operating at room or ambient temperature. Commonly temperatures of 50° to 90° F. can be used.

In addition thereto, the controlled length of time in, and the rate or withdrawal of the work from, the saturated vapors contained in this tank tends to even the film of paint from the top to the bottom of the work, first by allowing the paint to run down while the work is inside the vapors, then by starting oxidation of the paint and evaporation of the thinners from the top of the work downwards at the rate at which they are being withdrawn from the surface of the vapors. In the most preferred embodiment of this process, the work is withdrawn from the vapors at approximately the same rate as that at which the paint runs down the work.

The rate of withdrawal should usually be under 12 inches per minute and it seems that the meniscus between the vapor surface and the wet work helps further wash the paint film and considerably diminish the last drop. Also, during operation some of the thinner would tend to be lost by the turbulence caused by the work being withdrawn from the tank. The tank is so constructed that the back end perpendicular to the conveyor line is lowered to form a weir for the thinners to drop by gravity into the suction stream of an exhaust fan to a desired point. This enables the vapors (which are explosive as well as toxic) to be conducted outside the building or to some other safe location.

The tank acts as a trap for the solvent vapors which, being approximately four times heavier than air, remain there. Once an equilibrium of saturated solvent vapor is reached (within a few minutes from starting time), further vaporisation of solvents from the paint is restricted. A carbon dioxide blanket (twice as dense as air) is of assistance regarding the containment of the solvents, and produces two separate menisci for the work to wash through. This also provides more safety from fire hazards and health hazards, because there is no partially saturated vapor concentration at the top of the tank where the vapor surface is disturbed by turbulence.

Because the coating is done in a fully saturated solvent atmosphere, the composition keeps running down the work without oxidation or loss of solvents until the product starts being withdrawn from the surface of the vapors. This starts paint oxidation and thinner evaporation from the top of the work gradually moving to the bottom of the work. This type of withdrawal produces a uniform film thickness and much higher gloss. The high gloss is the result of continuous washing the surface of the paint film with the solvent vapor with a resulting tendency of smoothing out of the surface of the film.

When the article is of such configuration that the rate of down flow of the composition is not constant and varies at different places, then the dip in the conveyor line is so designed as to correspond the withdrawal rate of the work to the rate of down flow of the composition, so that finally the coat is uniform over the entire article despite the irregularities.

The ivnention is more fully described in connection with the accompanying drawing constituting a part hereof, and in which like reference characters indicate like parts, and in which.

Figure 1:
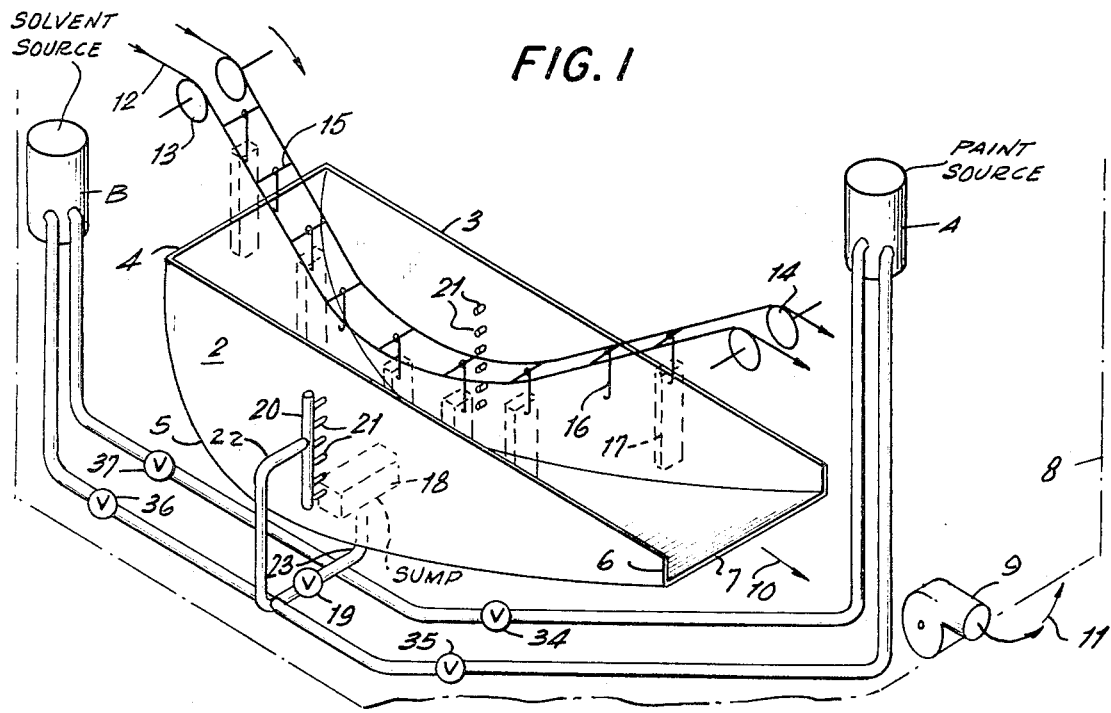
FIG. 1 is a diagrammatic perspective view of an apparatus adapted for use in practicing the invention.

Referring to FIG. 1, in a suitable space or room 1 is a tank having sides 2 and 3, an end wall 4 and a curved bottom 5, said curve parallel to the curve in the conveyor line. Said tank is also deep enough to fully contain the work at its deepest point. At the opopsite end wall 6 is a cutout portion 7 to permit vapors to spill out of the tank. Beyond opening 8 in the room is an exhaust fan 9 to draw the vapors shown by arrows 10 through exhaust pipe 11 and out of the room.

A conveyor 12 operates over rollers 13 and 14, and hangs in a loose or catenary curve which roughly parallels the curve 5 of the bottom of the tank. The conveyor has crossbars 15 from which are depending hooks or the like 16 on which articles or work to be sprayed, such as posts 17, are hung during their progress through the tank. At the lowest point of the tank is a sump 18 having pump 19 to start and maintain the flow of liquid in the system. On each side 2 and 3 of the tank is a vertical header 20 having a series of spray nozzles 21 projecting inwardly and which are fed by continuous recirculation of the paint in the system through pipes 22 and 23. When the paint quantity diminishes through paint used on the work 17, valve 34 is opened and more paint is admitted into pipe 23 on the intake side of pump 19. Likewise, more solvent is admitted by operating valve 37.

As the conveyor proceeds from left to right, posts 17 first pass through the atmosphere of vapor of solvent (and diluent) which fills the tank. Then it comes into the area of nozzles 21 and is coated with the liquid coating composition. It then proceeds into the righthand section of the tank where drainage of excess material takes place. As the posts gradually rise out above the surface of the vapors, the composition begins to set while the lower portion of the posts is still draining. As a result, the coating from top to bottom of the posts is substantially uniform.

The conveyor has been shown diagrammatically in the drawing in order to simplify the construction. There are several conveyors on the market which are suitable for use with the present system. Among them are the WEBB conveyor system of Jervis B. Webb Co., of South Gate, Calif., and the Zig-Zag power conveyor of J. V. Calhoun Co. of Bala-Cynwyd, Pa.

When it is desired to clean out the tank for any reason, valve 35 is opened and all the paint is pumped back into paint source A. Then valve 37 is opened and solvent from solvent source B is admitted into the system, and is recirculated through the nozzles until the system is flushed out. Similarly, by opening valve 36 the solvents are pumped back to their source B. Because the walls are wet with solvent, this operation becomes simple and rapid, and no scrubbing of the walls is necessary.

Figure 2:
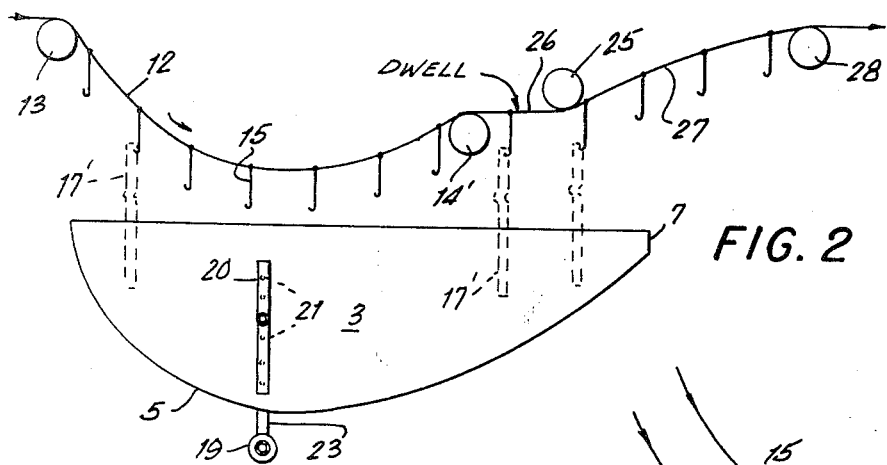
FIG. 2 is a diagrammatic side elevational view of a modified form of the invention, the front wall being broken away.

In FIG. 2, the structure and operation are similar. In case the articles have irregularities such as those posts 17' have, it becomes desirable to allow drainage therefrom. Therefore, the structure is modified in order to retard the rate of withdrawal of the work from the tank. To accomplish this, rollers 14 are replaced by rollers 14' which are located above and within the right-hand end of the tank so that posts passing by rollers 14' are still partially immersed in the solvent vapors. Additional rollers 25 provide a section 26 of conveyor 12 which travels horizontally or nearly so, allowing drainage until section 27 of the conveyor is reached. Rollers 28 serve to lift the conveyor sufficiently to raise posts 17' out of the vapors. In both FIGS. 1 and 2, the coated articles may be conveyed through a drying or baking oven, as is usual practice. The conveyors may be endless to form a closed circuit.

Figure 3:
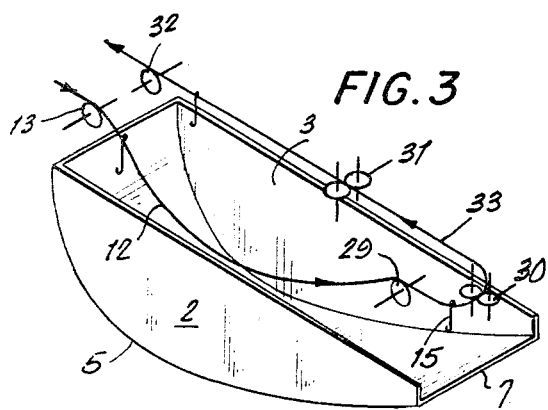
FIG. 3 is a view similar to FIG. 1 showing a still further modification of the invention.

In the modification of FIG. 3, if additional drainage time is desired, conveyor 12 is held between rollers 13 and 29, the latter being in a position similar to rollers 14' of FIG. 2. An additional set of rollers 30 near wall 3 serves to reverse the direction of movement of the conveyor, which travels horizontally by the guidance of rollers 31 and 32. The height of this section 33 of the conveyor is sufficient so that the posts or other articles are above the vapor level in the tank. Thereby all of the drippage flows back into the tank and, since evaporation of solvent does not take place to any extent in the bath of vapors, it is reusable as is and may be pumped directly from the tank into the spray nozzles.

Figure 4:
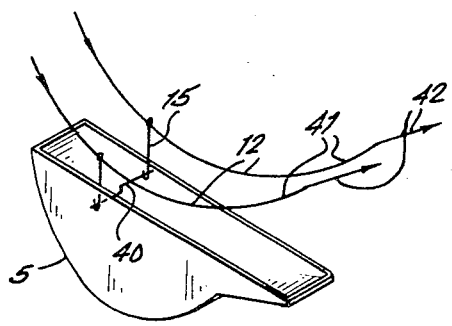
FIG. 4 is a diagramamtic view of another modification.

In many cases it is desirable or necessary that the work be withdrawn from the tank at an accelerated rate. FIG. 4 shows a modification which provides a shorter withdrawal time. The work 40 is held between two hooks 15 and passes through the tank on conveyor 12. At the exit end of the tank, the conveyor moves sharply upward as shown at 41, and then moves still more sharply upward as shown at 42.

Although the invention has been described in connection with several specific embodiments, many changes in the details may be made. For instance, various types of conveyors may be used, the shape of the tank may be made to conform with the work being treated, and articles of various types, sizes and shapes are adapted to be coated in the system. Other coating compositions then paints may be applied, such as lacquers, enamels, fungicides, insecticides, and the like. The system may include more than one source or color of coating composition.

The system may be modified and proportioned so that the relative time of spraying the composition and the time of drainage from the work may be varied. As an example, if there is to be an extended time of drainage, the horizontal portion 26 of the conveyor shown in FIG. 2 is extended to the right and the end of the tank is also extended. Or the horizontal portion of conveyor 26 may start just to the right of spray nozzles 21.

These and other changes may be made within the spirit of the invention, which is to be broadly construed and not to be limited except by the character of the claims appended thereto.

What is claimed is:

1. A method of coating articles which comprises providing an atmosphere at ambient temperatures consisting essentially of the vapors of a solvent, applying to said articles a coating composition containing a volatile solvent while said articles are in said vapors at said temperatures, and removing said articles slowly from said atmosphere.

2. A method according to claim 1 wherein said coating composition runs down said articles while said articles are immersed in said vapor, said articles being removed at a rate approximately equal to the rate at which said composition runs down said articles.

3. A method according to claim 1 characterized in that a blanket of inert gas is maintained on the surface of said vapors.

References Cited

UNITED STATES PATENTS

| | | | |
|---|---|---|---|
| 3,015,576 | 1/1962 | Hendrixson et al. | 117—105.3 |
| 3,030,913 | 4/1962 | Arnold et al. | 118—72 |
| 3,073,721 | 1/1963 | Pokorny | 117—102 X |
| 3,338,738 | 8/1967 | Lindemann. | |

ALFRED L. LEAVITT, Primary Examiner

J. H. NEWSOME, Assistant Examiner

U.S. Cl. X.R.

117—105.3; 118—324, 64